United States Patent [19]
Pesson

[11] 3,879,522
[45] Apr. 22, 1975

[54] NEW 2,3-DIHYDRO-1,4-BENZOXAZINES IN COMPOSITIONS EFFECTING THE CENTRAL NERVOUS SYSTEM

[75] Inventor: Marcel Pesson, Paris, France

[73] Assignee: Societe Anonyme dite: Laboratoire Roger Bellon, Neuilly-sur-Seine (Hauts de Seine), France

[22] Filed: July 6, 1972

[21] Appl. No.: 269,340

Related U.S. Application Data

[62] Division of Ser. No. 734,223, June 4, 1968, Pat. No. 3,681,330.

[30] Foreign Application Priority Data

June 6, 1967  United Kingdom............... 25999/67

[52] U.S. Cl. ................................................. 424/248
[51] Int. Cl. ............................................. A61k 27/00
[58] Field of Search .................................... 424/248

[56] References Cited
UNITED STATES PATENTS
2,850,495  9/1958  Williams et al. ................. 260/244 R FOREIGN PATENTS OR APPLICATIONS
1,307,154  9/1962  France ............................ 260/244 R

OTHER PUBLICATIONS

Chemical Abstracts, Vol. 64, Subject Index (A–D), p. 497s, (1966).

Irving et al., J. Chem. Soc. (Lowdow), 1963, pp. 3308–3309.

Primary Examiner—Stanley J. Friedman
Attorney, Agent, or Firm—Weiser, Stapler & Spivak

[57] ABSTRACT

The invention provides novel 3-oxo-2,3-dihydro-1,4-benzoxanines carrying a carbamoylakyl radical in the 5-position which have useful therapeutic properties as muscle relaxing agents, analgesics, anti-pyortics, anti-convulsion agents, anti-inflammatories, analgesics, and anti-pyretics.

31 Claims, No Drawings

NEW 2,3-DIHYDRO-1,4-BENZOXAZINES IN COMPOSITIONS EFFECTING THE CENTRAL NERVOUS SYSTEM

This is a divisional application of application Ser. No. 734,233, filed June 4, 1968, now U.S. Pat. No. 3,681,330.

This invention relates to dihydro-1,4-benzoxazines, their preparation and pharmaceutical compositions containing them.

The present invention provides the 3-oxo-2,3-dihydro-1,4-benzoxazines of the formula:

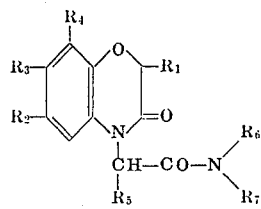

in which $R_1$ represents a hydrogen atom or a straight or branched lower alkyl radical, $R_2$, $R_3$ and $R_4$ are identical or different and each represents a hydrogen atom, a straight or branched lower alkyl radical, a halogen atom, or a lower alkoxy radical, $R_5$ represents a hydrogen atom, a lower alkyl radical, or a group of formula:

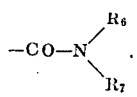

and $R_6$ and $R_7$ are identical or different and each represents a hydrogen atom, an aryl radical (e.g. phenyl or tolyl), a lower alkyl radical, or a lower hydroxyalkyl radical, or $R_6$ and $R_7$ taken together with the nitrogen atom to which they are attached, form a heterocyclic radical having 5 or 6 ring members which may contain hetero-atoms other than the nitrogen, such as pyrrolidyl, piperidyl, morpholinyl or piperazinyl. By "lower alkyl" is meant alkyl of 1 to 6 carbon atoms.

The compounds of formula I have valuable pharmacological properties on the central nervous system. They act as muscular relaxing agents, analgesics, antipyretics and anti-convulsion agents. Some of them furthermore have anti-inflammatory properties.

The compounds which combine anti-inflammatory and analgesic properties and an anti-pyretic effect are especially valuable.

According to a feature of the invention, the compounds of formula I are prepared by reaction of an acid halide, e.g. chloride, of an acid of formula:

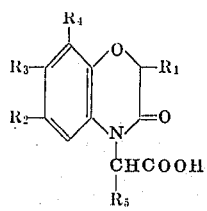

with ammonia or an amine of formula:

wherein the various symbols are as hereinbefore defined.

The starting materials of formula II are prepared from a 3-oxo-2,3-dihydro-1,4-benzoxazine of formula:

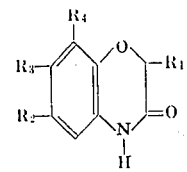

where $R_1$, $R_2$, $R_3$ and $R_4$ are as hereinbefore defined, whose alkali metal salt is condensed with a lower alkyl ester of the formula:

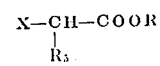

where X is halogen, R is lower alkyl, and $R_5$ is as hereinbefore defined, to yield the corresponding ester, which is then saponified to yield the acid of formula II.

The condensation of the alkali metal salt of the 3-oxo-2,3-dihydro-1,4-benzoxazine of formula IV and the α-halogenoester of formula V is best carried out in a lower alcohol, preferably tertiary butanol. The salt is itself prepared in situ by adding the 3-oxo-2,3-dihydrobenzoxazine to a solution of an equimolecular amount of the alkali metal alcoholate obtained by dissolving one equivalent of the metal in an excess of the selected alcohol. The reaction is continued by adding a slight molar excess (about 10%) of the α-halogenoester and heating under reflux with stirring until the medium, which is initially alkaline, is neutral. This requires 2 to 4 hours. The inorganic salts are filtered off while the solution is still hot. After evaporating the solvent, preferably in vacuo, the ester of the acid of formula II is precipitated by adding water. Sometimes the ester crystallises spontaneously; it is then filtered and recrystallised from a suitable solvent. Generally, however, the ester forms an oily or semi-crystalline mass, which is extracted with an appropriate solvent, and the organic solution is dried and the solvent evaporated. The residue is then recrystallised from a suitable solvent. Where they are not crystalline, the esters may optionally be distilled in a high vacuum or used without further purification, for the next operation.

The esters of formula V may be chloro, bromo, or iodo esters. In the case of the α-chloroesters it is possible to increase the speed of reaction by adding a small amount of potassium bromide or iodide to the reaction medium. To increase the reaction speed it is also possible to work in a mixture of solvents containing about 50% of dimethylformamide, which makes it possible to raise the temperature of the medium to 100°–110°C.

The acids of formula II are easily obtained in manner known per se by saponifying the corresponding esters with an alkali metal hydroxide, preferably potassium hydroxide, in an aqueous alcoholic (e.g. ethanolic) medium. This process is generally rapid (1 to 2 hours) at the reflux temperature of the alcohol. When the saponification is complete, the solvent is driven off, the residue is dissolved in water, and the acid liberated, generally in the solid state, by acidification with a strong inorganic acid. The acid is then filtered off and recrystalised from a suitable solvent.

The conversion of the acids of formula II into the compounds of formula I is conveniently carried out via the corresponding acid chlorides which can easily be obtained by reacting a slight excess (1.1 mols) of thionyl chloride with 1 mol of the acid in a neutral solvent (e.g., benzene, chloroform, or toluene). If necessary, a small amount of a catalyst such as pyridine or dimethylformamide may be used. The reaction is conveniently carried out at 60°–80°C. When it is ended, the solvent and the excess thionyl chloride are driven off in vacuo.

The crude acid chloride is dissolved in a non-polar neutral solvent such as an aromatic hydrocarbon, chloroform or methylene chloride. This solution is added, with vigorous stirring and cooling in ice, to an excess (3 to 5 mols) of the amine of formula III itself dissolved in a neutral solvent such as an aromatic hydrocarbon, chloroform or methylene chloride. After the reaction, the organic solution is filtered to remove the amine hydrochloride which has precipitated, and is then successively washed with a dilute solution of a strong inorganic acid (to remove excess amine), a dilute solution of an alkali metal hydroxide (to remove any acid of formula II) and then with water. After drying, the solvent is evaporated and the residue is recrystallised from a suitable solvent. It is possible to proceed to the acid and basic wash operations without filtering off the amine hydrochloride.

Where volatile bases of formula III which are very soluble in water are used, such as ammonia, methylamino or dimethylamine, it can be of value to proceed by adding the organic solution of the acid chloride to an excess of the amine in aqueous solution. It can then happen that the compound of formula I precipitates at the water/solvent interface. If this happens, it is filtered off and recrystallised from a suitable solvent.

When the compounds of formula I are not immediately obtained in the crystalline state, they may be distilled in a high vacuum to purify them sufficiently for crystallisation to be possible.

According to a further feature of the invention, the compounds of formula I are prepared by reaction of an alkali metal salt of a 3-oxo-2,3-dihydro-1,4-benzoxazine of formula IV with an α-halogenoamide of formula:

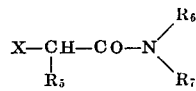

where X, $R_5$, $R_6$ and $R_7$ are as hereinbefore defined. The reaction is preferably carried out in a lower alcohol, preferably tertiary butyl alcohol, in which the salt of the compound of formula IV is prepared in situ as in the preceding method. A slight excess (10%) of the amide of formula VI is added to the solution of this salt, and the reaction, which frequently begins even at ordinary temperatures, is continued with stirring at the reflux temperature of the alcohol used. When this operation is complete (as indicated by the initially alkaline medium changing to give a neutral or acid reaction) the solution is filtered hot to remove the precipitated inorganic salts. The solvent is removed in vacuo and the residue, which is generally crystalline, is taken up in water, filtered, and washed with a dilute solution of an alkali metal hydroxide (to remove unreacted 3-oxo-2,3-dihydro-1,4-benzoxazine). After drying, the product of formula I is recrystallised from a suitable solvent.

In the amides of formula VI, X may be chlorine, bromine, iodine. When X is chlorine, the reaction may be catalysed by adding a small amount of potassium bromide or iodide to the medium.

The speed of reaction may also be increased by diluting the medium with an equal volume of dimethylformamide or dimethylsulphoxide. The process is then carried out at a temperature between 80° and 100°C.

With certain α-halogenoamides of formula VI whose halogen atom is particularly reactive, the reaction can be carried out at ambient temperature.

The second method, which is shorter, is particularly valuable when the α-halogenoamides of formula VI employed are tertiary. It also gives satisfactory yields with certain primary amides. With secondary α-halogenoamides the formation, as by-products, of 2,5-dioxopiperazines substituted in the 3,6-position and resulting from the autocondensation of 2 molecules of the halogenated amide with the elimination of 2 mols of the hydracid, is sometimes observed. It is then preferable to use the first method. The second method is also useful when the α-halogenoamide of formula VI is an N,N'-tetrasubstituted-halogenomaloxdiamide.

The following Examples illustrate the invention.

EXAMPLE 1

3-oxo-4-(morpholinocarboxylmethyl)-2,3-dihydro-1,4-benzoxazine.

A solution of potassium t-butoxide is prepared by dissolving 6.55 g. of metallic potassium in 250 cm³ of t-butyl alcohol in a two-necked flask fitted with a stirrer, a reflux condenser and a dropping funnel. The solution, cooled to 40°C., is vigorously stirred and 26 g. of 3-oxo-2,3-dihydro-1,4-benzoxazine are added thereto, followed by 20.5 g. of ethyl chloroacetate dropwise. The mixture is heated under reflux, with stirring, for 7 hours. The solvent is driven off in vacuo and the residue is taken up in about 200 cm³ of water. The partially crystalline precipitate is extracted with diethyl ether. The orgenic solution is washed with water and dried over anhydrous magnesium sulphate. The solvent is driven off and the residue is recrystallised from diisopropyl ether. The 3-oxo-4-carbethoxymethyl-1,4-dihydrobenzoxazine so obtained metls at 78°C. The yield is 30.8 g. (79%).

Analysis:
Calculated for $C_{12}H_{13}NO_4$:  C% = 61.27; H% = 5.57; N% = 5.96;
Found:  C% = 61.27; H% = 5.62; N% = 6.04.

20 g. of this ester are heated for 1 hour under reflux with 5.5 g. of potassium hydroxide in an aqueous alcoholic medium (200 cm³ of alcohol and 15 cm³ of water). The solvent is then driven off in vacuo, the residue is dissolved in water, and the solution is treated with animal charcoal, filtered, and then acidified with 4N hydrochloric acid. The precipitate is filtered off, washed with water and dried in vacuo over phosphorus pentoxide. The yield is 16.9 g. (92%) of 3-oxo-4-carboxymethyl-2,3-dihydro-1,4-benzoxazine, which, when purified by recrystallisation from ethanol, melts at 231°C.

Analysis:
Calculated for $C_{10}H_9NO_4$: C% = 57.97; H% = 4.38; N% = 6.76
Found: C% = 58.24; H% = 4.58; N% = 6.79.

3.2 cm³ of thionyl chloride and 0.1 cm³ of anhydrous pyridine are added to this acid (8.3 g.) suspended in 40 cm³ of benzene. The mixture is heated for 1 hour under reflux and the solvent and excess thionyl chloride are then driven off in vacuo. The solid residue is dissolved in 60 cm³ of anhydrous chloroform and the solution is added dropwise to a vigorously stirred solution of morpholine (8.7 cm³) in chloroform (60 cm³), cooled in an ice bath. After cooling to ambient temperature, the mixture is stirred for a further 2 hours and the precipitate is filtered off and then washed with chloroform. The combined organic solutions are washed first with 4N hydrochloric acid, then with water, then with 2N sodium hydroxide solution, and finally with water. After drying over magnesium sulphate, the solvent is driven off and the residue is recrystallised from benzene. The yield is 7.68 g. (69.7%). For analytical purposes, the 3-oxo-4-(morpholinocarboxylmethyl)-2,3-dihydro-1,4-benzoxazine is dried at 110°C/15 mm. It then melts at 155°–156°C.

Analysis:
Calculated for $C_{14}H_{16}N_2O_4$: C% = 60.86; H% = 5.84; N% = 10.14;
Found: C% = 60.83; H% = 6.11; N% = 10.24.

EXAMPLE 2

3-Oxo-4-(N-dimethylcarboxamidomethyl)-2,3-dihydro-1,4-benzoxazine

The acid chloride solution in 60 cm³ of chloroform is prepared as described in Example 1 from 8.3 g. of 3-oxo-4-carboxymethyl-2,3-dihydro-1,4-benzoxazine. The solution is added dropwise to 22 cm³ of a 29% strength dimethylamine solution in chloroform which is vigorously stirred and cooled in an ice bath. When the addition is complete, the mixture is stirred for 2 hours at ambient temperature. After filtering and washing the precipitate with chloroform, the organic solution is successively washed with 4N hydrochloric acid, water, and 2N sodium hydroxide solution and then dried over magnesium sulphate. The solvent is evaporated and the solid residue is recrystallised from a mixture of benzene (1 vol.) and cyclohexane (2 vols.). It melts at 125°–126°C. The yield is 6.17 g. (66%).

Analysis:
Calculated for $C_{12}H_{14}N_2O_3$: C% = 61.52; H% = 6.02; N% = 11.96;
Found: C% = 61.43; H% = 6.12; N% = 11.99.

EXAMPLE 3

3-Oxo-4-carboxamidomethyl-2,3-dihydro-1,4-benzoxazine

A solution of potassium t-butoxide obtained from 2.62 g. of metallic potassium and 100 cm³ of t-butyl alcohol is vigorously stirred and 10.1 g. of 3-oxo-2,3-dihydrobenzomorpholine are added to it. After stirring for 15 to 20 minutes at ordinary temperatures, 6.5 g. of chloracetamide are added and the mixture is heated for 4 hours under reflux. After cooling, the insoluble products are filtered off, and the solvent is evaporated. The residue is combined with the insoluble part and the whole is taken up in 200 cm³ of water. The solid product is filtered off and washed with 2 × 50 cm³ of sodium hydroxide solution to remove unreacted 3-oxo-2,3-dihydro-1,4-benzoxazine. It is then washed with water and dried. The yield is 10.54 g. (76.3%). After purification by recrystallisation from dimethylformamide, 7.42 g. of 3-oxo-4-carboxamidomethyl-2,3-dihydro-1,4-benzoxazine are obtained, m.p. 260°C.

Analysis:
Calculated for $C_{10}H_{10}N_2O_3$: C% = 58.25; H% = 4.89; N% = 13.58;
Found: C% = 58.32; H% = 4.97; N% = 13.53

EXAMPLE 4

3-Oxo-4-(N-o-tolylcarboxamidomethyl)-2,3-dihydro-1,4-benzoxazine

A solution of potassium t-butoxide is prepared by dissolving 2 g. of potassium in 100 cm³ of t-butyl alcohol. When the temperature has dropped to 30°–40°C., 7.45 g. of 3-oxo-2,3-dihydro-1,4-benzoxazine are added with stirring, followed by 10.08 g. of chloracetyl-0-toluidine. After 2 hours stirring at ambient temperature, the contents of the flask (which have set solid) are diluted with about 100 cm³ of ethanol. The solid is filtered off, washed with water to dissolve the inorganic salts, and recrystallised from dimethylformamide. The yield is 9.14 g. (61.6%), m.p. 229°C.

Analysis:
Calculated for $C_{17}H_{16}N_2O_2$: C% = 68.90; H% = 5.44; N% = 9.45;
Found: C% = 68.57; H% = 5.35; N% = 9.39.

EXAMPLE 5

3-Oxo-4-carboxamidomethyl-6-butyl-2,3-dihydro-1,4-benzoxazine

About 10.25 g. of 3-oxo-6-butyl-2,3-dihydro-1,4-benzoxazine followed by 50 cm³ of anhydrous dimethylformamide are added at 50°C. to a solution of potassium t-butoxide prepared as in the preceding Examples from 2.05 g. of metallic potassium and 50 cm³ of t-butyl alcohol. The mixture is stirred until a clear solution is obtained and 0.125 g. of potassium iodide followed by 5 g. of chloracetamide are then added. Stirring is continued whilst the temperature is kept at 105°C. until the medium is neutral. The greater part of the solvents is removed on a water bath in vacuo. The residue is taken up in 500 cm³ of water. The precipitate is extracted with benzene (500 cm³), and the organic solution is washed with 2N sodium hydroxide solution and then with water. After drying over magnesium sulphate and evaporating the solvent, the residue is recrystallised from a mixture of ethyl acetate and hexane. The yield is 9.22 g. (70%), m.p. 142°C.

Analysis:
Calculated for $C_{14}H_{18}N_2O_3$: C% = 64.10; H% = 6.92; N% = 10.68;
Found: C% = 64.03; H% = 6.90; N% = 10.80.

Tables I and II give the constants of compounds of formula I in which $R_5 = H$, prepared in accordance with the methods described above. The products of Examples 35 and 36 were prepared by the first method. The corresponding acid was obtained as described in Example 1. Condensation of the potassium salt of 3-oxo-6-chloro-2,3-dihydrobenzoxazine and ethyl chloracetate yielded 3-oxo-4-carbethoxymethyl-6-chloro-2,3-dihydro-1,4-benzoxazine, m.p. 115°C. (after recrystallisation from a mixture of cyclohexane and ether).

Analysis:
Calculated: C% = 53.44; H% = 4.49; N% = 5.19; Cl% = 13.15;
Found: C% = 53.29; H% = 4.48; N% = 4.97; Cl% = 13.16.

Saponification of this yielded 3-oxo-4-carboxymethyl-6-chloro-2,3-dihydro-1,4-benzoxazine, m.p. 197°C. (after recrystallisation from ethyl acetate).

Analysis:
Calculated: C% = 49.70; H% = 3.34; N% = 5.80; Cl% = 14.67;
Found: C% = 49.92; H% = 3.20; N% = 6—; Cl% = 14.44.

EXAMPLE 81

0.5 cm³ of dimethylformamide are added to 8.6 g. of 3-oxo-4-carboxymethyl-6-chloro-2,3-dihydro-1,4-benzoxazine suspended in 60 cm³ of thionyl chloride and the mixture is heated to 60°C. for 5 hours. The excess reagent is removed in vacuo and the residual acid chloride is taken up in 60 cm³ of benzene which are then evaporated in vacuo. This operation is repeated twice more to remove the thionyl chloride as completely as possible. The residue is dissolved in 60 cm³ of benzene and the solution is added dropwise to 40 g. of an aqueous 40% strength solution of dimethylamine. After standing overnight at ambient temperature, the precipitate formed at the interface of the solution is filtered off and recrystallised from ethyl acetate. 4.95 g. of 3-oxo-4-(N-dimethylcarboxamidomethyl)-6-chloro-2,3-dihydro-1,4-benzoxazine, identical to the product of Example 35, are obtained.

EXAMPLE 82

3-Oxo-4-(α-piperidinocarboxylether)-2,3-dihydro-1,4-benzoxazine

As in Example 1, 44.7 g. of 3-oxo-2,3-dihydro-1,4-benzoxazine are added to a solution of potassium t-butoxide prepared from 12 g. of metallic potassium and 350 cm³ of t-butyl alcohol, and 54.3 g. of ethyl α-bromopropionate are then added with stirring. The action is practically instantaneous (as shown by the formation of a copious precipitate of potassium bromide), and is completed by heating under reflux for 1 hour with stirring. The solution is filtered and evaporated to dryness. An uncrystallisable oil is obtained which is saponified without further purification.

The crude ester is added to an aqueous alcoholic solution (500 cm³ of ethanol and 40 cm³ of water) of potassium hydroxide (17.4g.) and the whole mixture is heated under reflux for 2 hours. The solvent is driven off in vacuo and the residue dissolved in 400 cm³ of water. The aqueous solution is extracted with diethyl ether and then acidified by adding hydrochloric acid. The 3-oxo-4-(α-carboxyethyl)-2,3-dihydro-1,4-benzoxazine which precipitates is filtered off, washed with water, dried and recrystallised from ethyl acetate (using animal charcoal). The yield is 42 g. (63.5%), m.p. 172°C.

Analysis:
Calculated for $C_{11}H_{11}NO_4$: C% = 59.72; H% = 5.01; N% = 6.33;
Found: C% = 59.55; H% = 5.21; N% = 6.34.

8.85 g. of this acid are converted into the corresponding chloride as described in Example 1, by reaction with 3.2 cm³ of thionyl chloride and 0.1 cm³ of pyridine in 40 cm³ of benzene. To avoid the formation of strongly coloured products it is advisable to stop the heating under reflux when the acid has completely dissolved. After evaporating the solvent, the residue is dissolved in 50 cm³ of chloroform and the solution is added, as described in the same Example, to a cooled, stirred solution of 8.5 g. of piperidine in 40 cm³ of chloroform. After stirring (2 hours) at ordinary temperatures, the mixture is washed with 3N hydrochloric acid and then with 2N NaOH and water. The chloroform solution is dried over magnesium sulphate, and evaporation of the solvent leaves an oil which, since it does not crystallise, is distilled in a high vacuum b.p. 170°–176°C./0.25 mm.Hg. The distilled oil crystallises when treated with hexane. The yield is 5.82 g. The 3-oxo-4-(α-piperidinocarboxylethyl)-2,3-dihydro-1,4-benzoxazine is purified by recrystallisation from hexane, m.p. 80°C.

Analysis:
Calculated for $C_{16}H_{20}N_2O_3$: C% = 66.64; H% = 6.99; N% = 9.72;
Found: C% = 66.73; H% = 7.25; N% = 9.76.

EXAMPLE 83

3-Oxo-4-(α-dimethylcarboxyamidoethyl)-2,3-dihydro-1,4-benzoxazine

The acid chloride prepared as in Example 51, dissolved in 40 cm³ of chloroform, is added to 90 cm³ of a 10% strength solution of dimethylamine in benzene. After the usual treatment, the amide is purified by recrystallisation from ethyl acetate. The yield is 6.25 g. (63.1%), m.p. 155°C.

Analysis:
Calculated for $C_{13}H_{16}N_2O_3$: C% = 62.89; H% = 6.50; N% = 11.28;
Found: C% = 63.02; H% = 6.55; N% = 11.31.

TABLE 1

Structure (R₄=H):

$$\begin{array}{c} R_3 \\ R_2 \end{array} \bigg\backslash \begin{array}{c} R_4 \\ \\ \end{array} \bigg/ \begin{array}{c} R_1 \\ O \\ N-CH_2-CO-N \begin{array}{c} R_6 \\ R_7 \end{array} \end{array}$$

Recrystallization solvent—
(a) Ethyl acetate  (h) Ethanol
(b) Isopropanol  (i) Isopropyl ether/benzene
(c) Water  (j) Benzene/petroleum ether
(d) Isopropyl ether  (k) Ether/petroleum ether
(e) Cyclohexane/benzene  (l) Ethanol/water
(f) Hexane/isopropyl ether  (m) Ethyleneglycol monoethyl ether
(g) Hexane  (n) Benzene

| Example No. | R₁ | R₂ | R₃ | overall formula | Method | Yield, percent | Melting point, °C. | Calculated C | Calculated H | Calculated N | Calculated Cl | Found C | Found H | Found N | Found Cl |
|---|---|---|---|---|---|---|---|---|---|---|---|---|---|---|---|
| 6 | H | H | H | R₆=H, R₇=CH₃  C₁₁H₁₂N₂O₃ | 1st | 50 | 183 (a) | 59.99 | 5.40 | 12.72 | | 60.4 | 5.83 | 12.70 | |
| 7 | H | H | H | R₆=H, R₇=C₂H₅  C₁₂H₁₄N₂O₃ | 1st | 59 | 196 (a) | 61.52 | 6.02 | 11.96 | | 61.64 | 6.20 | 12.04 | |
| 8 | H | H | H | R₆=H, R₇=—C₃H₇  C₁₃H₁₆N₂O₃ | 1st | 70 | 166 (a) | 62.89 | 6.50 | 11.28 | | 63.13 | 6.50 | 11.31 | |
| 9 | H | H | H | R₆=H, R₇=isoC₃H₇  C₁₃H₁₆N₂O₃ | 1st | 65 | 217 (a) | 62.89 | 6.50 | 11.28 | | 62.69 | 6.67 | 11.37 | |
| 10 | H | H | H | R₆=H, R₇=C₄H₉(n)  C₁₄H₁₈N₂O₃ | 1st | 52 | 188 (a) | 64.10 | 6.92 | 10.62 | | 63.88 | 6.96 | 10.90 | |
| 11 | H | H | H | R₆=H, R₇=CH₂—CH₂OH  C₁₃H₁₄N₂O₄ | 1st | 54.5 | 165 (a) | 57.56 | 5.64 | 11.20 | | 57.77 | 5.7 | 11.13 | |
| 12 | H | H | H | R₆=H, R₇=—C₆H₁₁  C₁₆H₂₀N₂O₃ | 1st | 71 | 236 (a) | 66.64 | 6.99 | 9.72 | | 66.43 | 6.20 | 9.95 | |
| 13 | H | H | H | —N⟨⟩N—CH₃, HCl  C₁₅H₁₉N₃O₃, HCl | 1st | 46 | 240/245 (h) | 55.29 | 6.19 | 12.90 | | 55.41 | 6.35 | 12.87 | |
| 14 | H | H | H | R₆=R₇=C₂H₅  C₁₄H₁₈N₂O₃ | 1st | 69 | 128 (c) | 64.10 | 6.92 | 10.68 | | 64.13 | 6.90 | 10.52 | |
| 15 | H | H | H | —N⟨⟩  C₁₅H₁₈N₂O₃ | 1st | 46 | 96 (d) | 65.67 | 6.61 | 10.21 | | 65.39 | 6.67 | 10.22 | |
| | | | | | 2nd | 60 | | | | | | | | | |

TABLE 1–Continued

Structure (R₄=H):

$$\text{structure with } R_1, R_2, R_3 \text{ on aromatic ring, O-CH}_2\text{ linkage, C=O, N, CH}_2\text{-CO-N(R}_6\text{)(R}_7\text{)}$$

| Example No. | R₁ | R₂ | R₃ | overall formula | Method | Yield, percent | Melting point, °C. | Calculated C | H | N | Cl | Found C | H | N | Cl |
|---|---|---|---|---|---|---|---|---|---|---|---|---|---|---|---|
| 16 | H | H | H | R₆=R₇=H<br>C₁₄H₁₆N₂O₃ ? ... overall C₁₄H₁₆N₂O₃ | 1st | 56 | 125 (e) | 64.60 | 6.20 | 10.76 | | 64.95 | 6.34 | 10.83 | |
| 17 | H | H | H | R₆=R₇=H<br>C₁₁H₁₂N₂O₃ | 2nd | 69 | 169 (c) | 59.99 | 5.49 | 12.72 | | 59.66 | 5.74 | 12.98 | |
| 18 | H | H | H | R₆=R₇=CH₃<br>C₁₃H₁₆N₂O₃ | 2nd | 76 | 101-182 | 62.89 | 6.50 | 11.28 | | 63.10 | 6.63 | 11.39 | |
| 19 | H | H | H | (piperidine)<br>C₁₆H₂₀N₂O₃ | 2nd | 77 | 111-112 (d) | 66.64 | 6.99 | 9.72 | | 66.71 | 7.14 | 9.82 | |
| 20 | —CH₃ | H | H | R₆=R₇=H<br>C₁₂H₁₄N₂O₃ | 2nd | 69.5 | 133 (c) | 61.52 | 6.02 | 11.96 | | 61.39 | 6.13 | 12.14 | |
| 21 | —C₂H₅ | H | H | R₆=R₇=CH₃<br>C₁₄H₁₈N₂O₃ | 2nd | 59 | 102 (d) | 64.10 | 6.92 | 10.68 | | 64.41 | 6.97 | 10.88 | |
| 22 | —C₂H₅ | H | H | R₆=R₇=C₂H₅<br>C₁₆H₂₂N₂O₃ | 2nd | 71 | 71 (g) | 66.18 | 7.64 | 9.65 | | 66.18 | 7.74 | 9.62 | |
| 23 | —C₂H₅ | H | H | C₆=H, R₇=—CH₂CH₂CH<br>C₁₄H₁₈N₂O₄ | 1st | 65 | 148-149 (c) | 60.42 | 6.52 | 10.07 | | 60.18 | 6.52 | 10.01 | |
| 24 | —C₂H₅ | H | H | (piperidine)<br>C₁₆H₂₀N₂O₃ | 1st | 84 | 96 (d) | 66.64 | 6.99 | 9.72 | | 66.71 | 6.88 | 9.96 | |
| 25 | —C₂H₅ | H | H | (piperidine, methyl)<br>C₁₇H₂₂N₂O₃ | 2nd | 35 | 78 (f) | 67.52 | 7.33 | 9.29 | | 67.92 | 7.33 | 9.27 | |
| 26 | —C₂H₅ | H | H | (morpholine)<br>C₁₅H₂₀N₂O₄ | 2nd | 50 | 125 (d) | 63.14 | 6.62 | 9.21 | | 63.04 | 6.75 | 9.05 | |

TABLE 1 – Continued (Structure: benzene ring with R1, R2, R3, R4(=H) substituents; O-C(R1)-N ring containing CH2-CO-N(R6)(R7); R3 substituent shown)

| Example No. | R1 | R2 | R3 | R6, R7 / overall formula | Method | Yield, percent | Melting point, °C | Calculated C | Calculated H | Calculated N | Calculated Cl | Found C | Found H | Found N | Found Cl |
|---|---|---|---|---|---|---|---|---|---|---|---|---|---|---|---|
| 27 | H | —CH₃ | H | R6=R7=H; C₁₁H₁₂N₂O₃ | 2nd | 42 | 226 (h) | 59.99 | 5.49 | 12.72 | — | 60.24 | 5.63 | 12.0 | — |
| 28 | H | —CH₃ | H | R6=R7=CH₃; C₁₃H₁₆N₂O₃ | 2nd | 65 | 156 (h) | 62.89 | 6.50 | 11.28 | — | 62.52 | 6.53 | 11.35 | — |
| 29 | H | —CH₃ | H | (piperidino); C₁₆H₂₀N₂O₃ | 2nd | 73.5 | 137 (d) | 66.64 | 6.99 | 9.72 | — | 66.67 | 7.03 | 8.80 | — |
| 30 | —C₂H₅ | —CH₃ | H | R6=R7=H; C₁₃H₁₆N₂O₃ | 2nd | 45 | 153 (a) | 62.89 | 6.50 | 11.28 | — | 63.17 | 6.72 | 11.41 | — |
| 31 | —C₂H₅ | —CH₃ | H | R6=R7=—CH₃; C₁₅H₂₀N₂O₃ | 2nd | 71 | 140 (i) | 65.19 | 7.30 | 10.14 | — | 64.91 | 7.53 | 10.34 | — |
| 32 | —C₂H₅ | —CH₃ | H | (piperidino); C₁₈H₂₄N₂O₃ | 2nd | 62 | 124–125 (d) | 68.23 | 7.65 | 8.85 | — | 68.19 | 7.53 | 8.90 | — |
| 33 | H | ter. C₄H₉ | H | R6=R7=CH₃; C₁₆H₂₂N₂O₃ | 2nd | 65 | 136 (j) | 66.18 | 7.64 | 9.65 | — | 66.15 | 7.80 | 9.82 | — |
| 34 | H | Cl | H | R6=R7=H; C₁₀H₉ClN₂O₃ | 2nd | 68 | 216 (n) | 49.91 | 3.77 | 11.64 | 14.73 | 49.79 | 3.97 | 11.52 | 14.87 |
| 35 | H | Cl | H | R6=R7=CH₃; C₁₂H₁₃ClN₂O₃ | 1st | 51 | 188 (a) | 53.64 | 4.87 | 10.43 | 13.20 | 53.55 | 5.10 | 10.53 | 13.30 |
| 36 | H | Cl | H | R6=H, R7=CH₂—CH₂CH; C₁₂H₁₃ClN₂O₄ | 1st | 54 | 162 (a) | 50.62 | 4.60 | 9.84 | 12.45 | 50.58 | 4.62 | 9.71 | 12.70 |
| 37 | H | Cl | H | R6=R7=C₂H₅; C₁₄H₁₇ClN₂O₃ | 2nd | 77 | 159 (a) | 56.66 | 5.77 | 9.44 | 11.95 | 56.90 | 6.00 | 9.34 | 12.07 |

TABLE 1.—Continued

Structure (R$_4$=H):

$$\begin{array}{c} R_1 \\ R_4 \diagdown \diagup O \diagdown \diagup R_1 \\ | \quad C=O \\ R_3 \diagup \diagdown \diagup N \diagdown CH_2-CO-N \diagup R_6 \\ R_2 \quad \quad \quad \quad \quad \diagdown R_7 \end{array}$$

Amine group: $-N\diagup^{R_6}_{\diagdown R_7}$

| Example No. | R$_1$ | R$_2$ | R$_3$ | overall formula | Method | Yield, percent | Melting point, °C. | Analysis, percent Calculated C | H | N | Cl | Found C | H | N | Cl |
|---|---|---|---|---|---|---|---|---|---|---|---|---|---|---|---|
| 38 | H | Cl | H | [pyridyl ring] C$_{14}$H$_{15}$ClN$_2$O$_3$ | 2nd | 74 | 177 | 57.05 | 5.13 | 9.50 | 12.03 | 57.20 | 5.33 | 9.31 | 11.99 |
| 39 | H | Cl | H | [cyclohexyl ring] C$_{15}$H$_{17}$ClN$_2$O$_3$ | 2nd | 60 | 116 (k) | 58.35 | 5.55 | 9.07 | 11.68 | 58.32 | 5.56 | 8.89 | 11.40 |
| 40 | H | Cl | H | [morpholine ring] C$_{14}$H$_{15}$ClN$_2$O$_4$ | 2nd | 79 | 167 (n) | 54.11 | 4.86 | 9.01 | 11.41 | 54.17 | 5.10 | 8.78 | 11.60 |
| 41 | —C$_2$H$_5$ | Cl | H | R$_6$=R$_7$=H  C$_{12}$H$_{13}$ClN$_2$O$_3$ | 2nd | 49 | 170 (l) | 53.63 | 4.88 | 10.43 | 13.20 | 53.37 | 4.87 | 10.17 | 13.40 |
| 42 | —C$_2$H$_5$ | Cl | H | R$_6$=R$_7$=—CH$_3$  C$_{14}$H$_{17}$ClN$_2$O$_3$ | 2nd | 56 | 131 (l) | 56.66 | 5.77 | 9.44 | 11.95 | 56.74 | 5.92 | 9.25 | 12.18 |
| 43 | H | H | Cl | R$_6$=R$_7$=H  C$_{10}$H$_9$ClN$_2$O$_3$ | 2nd | 75 | 262 (m) | 49.91 | 3.77 | 11.64 | 14.74 | 49.91 | 3.85 | 11.57 | 14.58 |
| 44 | H | H | Cl | R$_6$=R$_7$=CH$_3$  C$_{12}$H$_{13}$ClN$_2$O$_3$ | 2nd | 46 | 171 (n) | 53.63 | 4.87 | 10.43 | 13.20 | 53.84 | 5.10 | 10.33 | 13.32 |
| 45 | —C$_2$H$_5$ | H | Cl | R$_6$=R$_7$=H  C$_{12}$H$_{13}$ClN$_2$O$_3$ | 2nd | 75 | 176 (n) | 53.63 | 4.87 | 10.43 | 13.20 | 53.47 | 4.85 | 10.33 | 13.18 |
| 46 | —C$_2$H$_5$ | H | Cl | R$_6$=R$_7$=CH$_3$  C$_{14}$H$_{17}$ClN$_2$O$_3$ | 2nd | 67 | 114 (g) | 56.66 | 5.77 | 9.44 | 11.95 | 56.49 | 5.97 | 9.30 | 12.06 |
| 47 | H | H | —OCH$_3$ | R$_6$=R$_7$=H  C$_{11}$H$_{12}$N$_2$O$_4$ | 2nd | 65 | 247 (m) | 55.93 | 5.12 | 11.86 | | 55.90 | 5.20 | 11.79 | |
| 48 | H | H | —OCH$_3$ | R$_6$=R$_7$=CH$_3$  C$_{13}$H$_{16}$N$_2$O$_4$ | 2nd | 51 | 145 (h) | 59.08 | 6.10 | 10.60 | | 59.04 | 5.93 | 10.67 | |
| 49 | H | H | —OC$_2$H$_5$ | R$_6$=R$_7$=H  C$_{12}$H$_{14}$N$_2$O$_4$ | 2nd | 63 | 216 (h) | 57.59 | 5.64 | 11.20 | | 57.56 | 5.66 | 11.16 | |

TABLE I – Continued

Structure:

($R_4 = H$)

| Example No. | $R_1$ | $R_2$ | $R_3$ | $-N\begin{smallmatrix}R_6\\R_7\end{smallmatrix}$ overall formula | Method | Yield, percent | Melting point, °C. | Calculated C | Calculated H | Calculated N | Calculated Cl | Found C | Found H | Found N | Found C |
|---|---|---|---|---|---|---|---|---|---|---|---|---|---|---|---|
| 50 | H | H | $-OC_2H_5$ | $R_6=R_7=CH_3$ $C_{14}H_{18}N_2O_4$ | 2nd | 57 | 113 (j) | 60.42 | 6.52 | 10.07 | | 60.24 | 6.35 | 10.17 | |
| 51 | $-C_2H_5$ | H | $-OC_2H_5$ | $R_6=R_7=H$ $C_{14}H_{18}N_2O_4$ | 2nd | 80 | 154 (n) | 60.42 | 6.52 | 10.07 | | 60.51 | 7.74 | 10.06 | |
| 52 | $-C_2H_5$ | H | $-OC_2H_5$ | $R_6=R_7=CH_3$ $C_{16}H_{22}N_2O_4$ | 2nd | 54 | 111 (d) | 62.72 | 7.24 | 9.14 | | 62.77 | 7.40 | 9.04 | |
| 53 | $-C_2H_5$ | H | $-OCH_3$ | $R_6=R_7=H$ $C_{13}H_{16}N_2O_4$ | 2nd | 57 | 150 (a) | 59.08 | 6.10 | 10.60 | | 58.86 | 6.11 | 10.62 | |
| 54 | $-C_2H_5$ | H | $-OCH_3$ | $R_6=R_7=CH_3$ $C_{15}H_{20}N_2O_4$ | 2nd | 60 | 89 (j) | 61.63 | 6.90 | 9.58 | | 61.64 | 7.07 | 9.69 | |
| 55 | $C_3H_7$ (iso) | H | H | $R_6=R_7=H$ $C_{13}H_{18}N_2O_3$ | 2nd | 47 | 149 (n) | 62.82 | 6.50 | 11.28 | | 62.81 | 6.70 | 11.32 | |
| 56 | $C_3H_7$ (iso) | H | H | $R_6=R_7=CH_3$ $C_{15}H_{22}N_2O_3$ | 2nd | 87 | 81 (d) | 65.19 | 7.30 | 10.14 | | 64.99 | 7.34 | 10.08 | |
| 57 | $C_3H_7$ (iso) | H | H |  $C_{18}H_{24}N_2O_3$ | 2nd | 27 | 81 (g) | 68.33 | 7.65 | 8.85 | | 68.13 | 7.68 | 8.93 | |
| 58 | $C_4H_9$ (n) | H | H | $R_6=R_7=H$ $C_{14}H_{18}N_2O_3$ | 2nd | 49 | 139 (n) | 64.10 | 6.92 | 10.68 | | 63.71 | 6.92 | 10.90 | |
| 59 | $C_4H_9$ (n) | H | H | $R_6=R_7=H$ $C_{16}H_{22}N_2O_3$ | 2nd | 54 | 75 (g) | 66.18 | 7.64 | 9.65 | | 66.48 | 7.06 | 9.45 | |
| 60 | $C_4H_9$ (n) | H | H |  $C_{19}H_{26}N_2O_3$ | 2nd | 36 | 64 (g) | 69.06 | 7.93 | 8.48 | | 69.07 | 8.13 | 8.61 | |
| 61 | $C_4H_9$ (n) | $CH_3$ | H | $R_6=R_7=H$ $C_{15}H_{20}N_2O_3$ | 2nd | 32 | 155 (l) | 65.19 | 7.30 | 10.14 | | 65.54 | 7.60 | 10.17 | |

TABLE 1 – Continued

Structure (R$_4$=H):

$$\begin{array}{c} R_1 \\ R_3 \diagdown \diagup O \\ \phantom{R_3}\diagdown \diagup \\ R_2 \diagup \phantom{OOO} \diagdown N-CH_2-CO-N \diagup^{R_6}_{R_7} \\ \phantom{R_2 \diagup} O \end{array}$$

| Example No. | R$_1$ | R$_2$ | R$_3$ | $-N\diagup^{R_6}_{R_7}$ overall formula | Method | Yield, percent | Melting point, °C. | Calculated C | Calculated H | Calculated N | Calculated Cl | Found C | Found H | Found N | Found C |
|---|---|---|---|---|---|---|---|---|---|---|---|---|---|---|---|
| 62 | C$_4$H$_9$ | —CH$_3$ | H | R$_6$=R$_7$=CH$_3$ C$_{17}$H$_{24}$N$_2$O$_3$ | 2nd | 67 | 122–123 (n) | 67.08 | 7.95 | 9.20 | | 66.65 | 8.24 | 9.42 | |
| 63 | C$_4$H$_9$ | —CH$_3$ | H | (piperidino) C$_{20}$H$_{28}$N$_2$O$_3$ | 2nd | 43 | 80 (g) | 69.74 | 8.19 | 8.13 | | 69.61 | 8.39 | 8.31 | |
| 64 | H | —O—CH$_3$ | H | R$_6$=R$_7$=CH$_3$ C$_{13}$H$_{16}$N$_2$O$_4$ | 2nd | 68 | 135 (a) | 59.08 | 6.10 | 10.60 | | 58.99 | 6.15 | 10.64 | |
| 65 | H | C$_4$H$_9$ (n) | H | R$_6$=R$_7$=—CH$_3$ C$_{16}$H$_{22}$N$_2$O$_3$ | 2nd | 75 | 108 (g./h.) | 66.18 | 7.64 | 9.65 | | 66.01 | 7.53 | 9.76 | |
| 66 | H | C$_5$H$_{11}$ (tert.) | H | R$_6$=R$_7$=H C$_{15}$H$_{20}$N$_2$O$_3$ | 2nd | 62 | 157 (g./h.) | 65.19 | 7.30 | 10.14 | | 65.33 | 7.47 | 10.17 | |
| 67 | H | C$_5$H$_{11}$ (tert.) | H | R$_6$=R$_7$=CH$_3$ C$_{17}$H$_{24}$N$_2$O$_3$ | 2nd | 50 | 140 (a./g.) | 67.08 | 7.95 | 9.20 | | 66.70 | 8.11 | 9.25 | |
| 68 | H | H | CH$_3$ | R$_6$=R$_7$=CH$_3$ C$_{13}$H$_{16}$N$_2$O$_3$ | 2nd | 81 | 126 (g) | 62.89 | 6.50 | 11.28 | | 63.21 | 6.61 | 11.28 | |

TABLE II

In the following compounds R₅ is hydrogen, and the recrystallization solvents are named or indicated as in Table I (R₄ = R₅ = H)

| Example No. | R₁ | R₂ | R₄ | R₆, R₇ overall formula | Method | Yield, percent | Melting point, °C. | Analysis percent Calculated C | H | N | Cl | Found C | H | N | Cl |
|---|---|---|---|---|---|---|---|---|---|---|---|---|---|---|---|
| 69 | C₂H₅ | Cl | —CH₃ | R₆=R₇=H  C₁₃H₁₅ClN₂O₃ | 2nd | 50 | 179/180 (n) | 55.22 | 5.35 | 9.91 | 12.54 | 55.44 | 5.25 | 9.80 | 12.60 |
| 70 | C₂H₅ | Cl | —CH₃ | R₆=R₇=CH₃  C₁₅H₁₉ClN₂O₃ | 2nd | 77 | 151 Methanol | 57.96 | 6.61 | 9.01 | 11.41 | 57.90 | 6.36 | 9.21 | 11.60 |
| 71 | C₂H₅ | Cl | —CH₃ | —N⟨⟩ C₁₈H₂₃ClN₂O₃ | 2nd | 74 | 141 Methanol | 61.61 | 6.60 | 7.98 | 10.10 | 61.29 | 6.64 | 8.09 | 10.33 |
| 72 | H | Cl | CH₃ | R₆=R₇=H  C₁₁H₁₁ClN₂O₃ | 2nd | 35 | 230/232 (DMF) | 51.86 | 9.35 | 11.00 | 13.92 | 51.78 | 4.58 | 11.29 | 13.85 |
| 73 | H | Cl | CH₃ | R₆=R₇=CH₃  C₁₃H₁₅ClN₂O₃ | 2nd | 77 | 189/190 (n) | 55.22 | 5.35 | 9.91 | 12.54 | 55.60 | 5.25 | 9.93 | 12.60 |
| 74 | H | Cl | CH₃ | —N⟨⟩ C₁₆H₁₉ClN₂O₃ | 2nd | 82 | 159 (n) | 59.52 | 5.92 | 8.67 | 10.98 | 59.21 | 6.09 | 8.54 | 11.17 |
| 75 | H | Br | CH₃ | R₆=R₇=H  C₁₁H₁₁BrN₂O₃ | 2nd | 41 | 237 (n) | 44.18 | 3.70 | 9.37 |  | 44.06 | 3.95 | 9.38 |  |
| 76 | H | Br | CH₃ 900 | R₆=R₇=CH₃  C₁₃H₁₅BrN₂O₃ | 2nd | 77 | 194 (n) | 47.70 | 4.62 | 8.78 |  | 47.74 | 4.81 | 8.78 |  |
| 77 | H | Cl | Cl | R₆=R₇=H  C₁₀H₉ClN₂O₃ | 2nd | 75 | 257 | 49.41 | 3.77 | 11.64 | 14.73 | 49.75 | 3.61 | 11.88 | 14.69 |
| 78 | H | Cl | Cl | R₆=R₇=CH₃  C₁₂H₁₃ClN₂O₃ | 2nd | 50 | 160 (n) | 53.63 | 4.87 | 10.43 | 13.20 | 54.00 | 4.87 | 10.43 | 13.20 |
| 79 | H | Cl | Cl | —N⟨⟩ C₁₅H₁₇ClN₂O₃ | 2nd | 69 | 156 (g./c.) | 58.35 | 5.55 | 9.07 | 11.48 | 58.20 | 5.55 | 9.07 | 11.48 |
| 80 | H | H | CH₃ | R₆=R₇=—CH₃  C₁₃H₁₆N₂O₃ | 2nd | 80 | 136 (g.) | 62.89 | 6.50 | 11.28 |  | 62.90 | 6.34 | 11.38 |  |

EXAMPLE 84

3-Oxo-4-(α-diethylcarboxyamidoethyl)-2,3-dihydro-1,4-benzoxazine

This amide is obtained as in the preceding Examples, by reaction of the appropriate acid chloride with diethylamine in chloroform solution. The yield is 55%, m.p. 90°–91°C. after recrystallisation from hexane.

Analysis:
Calculated for $C_{15}H_{20}N_2O_3$: C% = 65.19; H% = 7.30; N% = 10.14;
Found: C% = 65.27; H% = 7.60; N% = 10.40.

EXAMPLE 85

3-Oxo-4-(α-pyrrolidinocarboxylethyl)-2,3-dihydro-1,4-benzoxazine

This compound is obtained as in the preceding Examples from the corresponding acid chloride and pyrrolidine. It is a white solid, m.p. 80°C. (after recrystallisation from a mixture of hexane (100 v.) and diisopropyl ether (100:30 v/v)).

Analysis:
Calculated for $C_{15}H_{18}N_2O_3$: C% = 65.67; H% = 6.61; N% = 10.21;
Found: C% = 65.66; H% = 6.77; N% = 10.15.

EXAMPLE 86

A solution of potassium t-butoxide is prepared from 2 g. of potassium and 100 cm³ of t-butanol in the apparatus described in Example 1. 8.86 g. of 2-ethyl-3-oxo-2,3-dihydro-1,4-benzoxazine followed by 17.4 g. of N,N'-penta-methylenebromo-malondiamido are added to the solution with good agitation while it is still warm. After heating under reflux for 2½ hours, the solvent is distilled off in vacuo, the residue is taken up in water (100 cm³), and the mixture is extracted with diethylether. The organic extract is washed 3 times with 2N sodium hydroxide solution and then with water, and then dried over anhydrous magnesium sulphate. Evaporation of the sulphate leaves a viscous residue which crystallises after treatment with 150 cm³ of petroleum ether. 5-Ethyl-3-oxo-4-bis(N-pentamethylenecarboxyamido)methyl-2,3-dihydro-1,4-benzoxazine (13.31 g.) is filtered off and recrystallised from diisopropyl ether. The yield is 10.96 g. (53%), m.p. 138°C.

Analysis:
Calculated for $C_{23}H_{31}N_3O_4$: C% = 66.80; H% = 7.56; N% = 10.16;
Found: C% = 67.33; H% = 7.78; N% = 10.17.

EXAMPLE 87

N,N'-Pentamethylenebromo-malondiamide is reacted with the potassium salt of 3-oxo-2,3-dihydro-1,4-benzoxazine by the procedure described in Example 86, and 3-oxo-4-bis(N-pentamethylenecarboxyamidomethyl-2,3-dihydro-1,4-benzoxazine is obtained in a yield of 57% after recrystallisation from ethyl acetate, m.p. 184°C.

Analysis:
Calculated for $C_{21}H_{27}N_3O_4$: C% = 65.43; H% = 7.06; N% = 10.90;
Found: C% = 65.51; N% = 6.80; H% = 11.03.

EXAMPLE 88

3-Oxo-4-bis(N-pentamethylenecarboxamido)methyl-6-methyl-2,3-dihydro-1,4-benzoxazine, m.p. 182°C., is obtained by the process described in Example 81 from 3-oxo-6-methyl-2,3-dihydro-1,4-benzoxazine, in a yield of 42% after recrystallisation from ethyl acetate.

Analysis:
Calculated for $C_{22}H_{29}N_3O_4$: C% = 66.14; H% = 7.32; N% = 10.52;
Found: C% = 66.36; H% = 7.56; N% = 10.62.

EXAMPLE 89

3-Oxo-4-bis(N-pentamethylenecarboxamide)methyl-6-chloro-2,3-dihydro-1,4-benzoxazine is prepared by the process in Example 81 from the potassium salt of 3-oxo-6-chloro-2,3-dihydro-1,4-benzoxazine, and is obtained in a yield of 63% after recrystallisation from a mixture of benzene and cyclohexane, m.p. 145°C.

Analysis:
Calculated for $C_{21}H_{26}ClN_3O_4$: C% = 60.00; H% = 6.24; N% = 10.00
Found: C% = 60.00; H% = 6.48; N% = 10.05.

EXAMPLE 90

3-Oxo-4-bis(N-dimethylcarboxamido)methyl-2,3-dihydro-1,4-benzoxazine is prepared by the process of Example 81 by the action of N,N'-tetramethyl-bromomalondiamide on the potassium salt of 3-oxo-2,3-dihydro-1,4-benzoxazine. After recrystallisation from ethyl acetate, it melts at 154°C. The yield is 48%.

Analysis:
Calculated for $C_{25}H_{19}N_3O_4$: C% = 59.00; H% = 6.27; N% = 13.76;
Found: C% = 59.16; H% = 6.46; N% = 13.88.

Using the same experimental conditions, N,N'-tetramethylbromomalondiamide may be reacted with suitably substituted 3-oxo-2,3-dihydro-1,4-benzoxazines to give the products described in the following Examples.

EXAMPLE 91

Proceed as in Example 90 from appropriate starting materials, 2-ethyl-3-oxo-4-bis(N-dimethylcarboxamido)methyl-2,3-dihydro-1,4-benzoxazine is obtained in a yield of 43% after recrystallisation from diisopropyl ether. It melts at 116°–117°C.

Analysis:
Calculated for $C_{17}H_{23}N_3O_4$: C% = 61.24; H% = 6.95; N% = 12.61;
Found: C% = 61.27; H% = 7.08; N% = 12.66.

EXAMPLE 92

Proceeding as in Example 90 from appropriate starting materials, 3-oxo-4-bis(N-dimethylcarboxamido)methyl-6-methyl-2,3-dihydro-1,4-benzoxazine is obtained in a yield of 31% after recrystallisation from a mixture of benzene and cyclohexane, m.p. 205°C.

Analysis:
Calculated for $C_{16}H_{21}N_3O_4$: C% = 60.17; H% = 6.63; N% = 13.16;
Found: C% = 60.23; H% = 6.80; N% = 13.01.

EXAMPLE 93

3-Oxo-4-bis(N-dimethylcarboxamido)methyl-6-chloro-2,3-dihydro-1,4-benzoxazine is obtained by the procedure of Example 90 from appropriate starting materials in a yield of 43%. After recrystallisation from methanol, it melts at 199°C.

Analysis:
Calculated for $C_{15}H_{18}ClN_3O_4$: C% = 53.02; H% = 5.34; N% = 12.27; Cl% = 10.43;
Found: C% = 53.01; H% = 5.71; N% = 12.26; Cl% = 10.68.

The compounds of the invention have been studied by the following test methods:

Toxicity

The lethal dose (LD 50) was determined intraperitoneally and orally for batches of 5 to 10 male mice weighing 18 to 24 g., and calculated by the method of probits.

Analgesic Effect. (Siegmund test in mice).

Pain is caused by intraperitoneal injection of a 2% aqueous alcholic solution of phenyl-para-quinone, which causes characteristic dropping of the rear quarters during movement. The compound studied was orally administered 30 minutes previously. The number of syndromes manifested in one batch of mice during 5 minutes observation immediately after injection of the pain producing substance was counted, and again counted 15, 30, 45 and 60 minutes later. The total number of syndromes found is compared with that obtained in a control bath of mice.

Anti-inflammatory Effect. (Carragenin oedema in rats).

The substance studied is administered orally 1 hour before intraplantar injection of Carragenin (0.05 ml of a 1% strength solution). The volume of the paw is measured by plethysmography 3 hours afterwards and compared with the initial volume. All the new compounds were tested at the same dose of 100 mg/kg, a dose of which phenylbutazone produces 50% inhibition.

Antipyretic Effect in guinea pigs.

Hyperthermy is produced by injecting a 50% solution of powdered milk subcutaneously at the rate of 2 ml per animal. The rectal temperature is measured during the 3 hours following the injection of milk. The compound under test is administered intraperitoneally in a dose of 125 mg/kg.

Depressant Effect on the "righting reflex."

This is the loss of the righting reflex in mice after oral administration of the compound studied. Since the distinction between hypnotic effect and paralysing effect is not easy in mice, substances which showed an interesting activity in mice were also studied in rabbits.

Anticonvulsant effect

Pentetrazol at a dose of 120 mg./kg. and strychnine at a dose of 2.2 mg./kg. are administered intraperitoneally to batches of 10 mice which had 30 minutes earlier received the substance being studied. The number of mice protected against tonic crisis and death is recorded.

General sedative effects

Measurement of motility by activography

The number of movements of a mouse placed in an individual cage is recorded by means of a crossed beam and photoelectric cell device. The number of movements during the first 5 minutes indicates the curiosity and that during the following 20 minutes the motility. The average number of movements for treated batches and for reference batches is compared.

Boosting of barbituric hypnosis (test of return to sleep)

The substance studied is injected at a non-hypnotic dose after dissipation of the slumber induced by hexobarbital (75 mg./kg. administered intraperitoneally). The number of mice who lose the turning reflex and the average duration of slumber are recorded.

Anti-depressant effect. (Antagonism of ptosis caused by reserpine in mice)

The compound is administered intraperitoneally 1 hour before the reserpine (2 mg./kg. intraperitoneally) and the ptosis is measured every 30 minutes between the second and fourth hour after injection of the reserpine.

RESULTS

Tr

Analgesic effect

The compound of Example 33 (4-dimethylcarboxamidomethyl-6-butyl-3-oxo-2,3-dihydro-1,4-benzoxazine) and the compound of Example 30 (2-ethyl-4-(α-carboxamidoethyl)-6-methyl-3-dihydro-1,4-benzoxazine) have a valuable effect. The table which follows gives the effective doses (ED 50) of these two compounds and shows that they are as active as aspirin but less toxic.

| Compound | LD 50 (oral in mg./kg.) | Effective dose ED 50 (mg./kg.) |
|---|---|---|
| Ex. 30 | >1500 | 80 |
| Ex. 33 | >1500 | 60 |
| Asprin | 1000–1500 | 75 |

4-N-dimethylcarboxamidomethyl-8-chloro-3-oxo-2,3-dihydro-1,4-benzoxazine (the product of Example 78) and 4-N-pentamethylenecarboxamidomethyl-8-chloro-3-oxo-2,3-dihydro-1,4-benzoxazine (the product of Example 79) show interesting properties against visceral pain in Siegmund's test. When administrated orally, these compounds show a greater activity than aspirin in a dose of 100 mg./kg., and are less toxic.

| Compound | LD 50 Intraperitoneally | LD 50 orally | % inhibitions of painful symptoms |
|---|---|---|---|
| Ex. 78 | >900 | >1500 | 61 |
| Ex. 79 | >1000 |  | 70 |
| Aspirin | 495 | 1000–1500 | 54 |

Antipyretic effect

The products of Example 41 (2-ethyl-4-carboxamidomethyl-6-chloro-3-oxo-2,3-dihydro-1,4-benzoxazine), Example 42 (2-ethyl-4-(N-dimethylcarboxamidomethyl)-6-chloro-3-oxo-2,3-dihydro-1,4-benzoxazine) and Example 20 (2-ethyl-4-carboxamidomethyl-3-oxo-2,3-dihydro-1,4-benzoxazine) have valuable antipyretic properties, as shown in the following table.

| Compound | LD 50 (oral in mg./kg.) | Maximum temperature lowering observed |
|---|---|---|
| Ex. 41 | 1150 | 2°C. |
| Ex. 42 | 1400 | 1.5°C. |
| Ex. 20 | >1500 | 1.2°C. |
| Aspirin | 1000–1500 | 0.7°C. |

2-Butyl-4-N-pentamethylenecarboxamidomethyl-6-methyl-3-oxo-2,3-dihydro-1,4-benzoxazine (the product of Example 63) also shows analgesic and antipyretic effects. It has an intraperitoneal LD 50 of greater than 1000 mg./kg., and an oral LD 50 greater than 1500 mg./kg. In Siegmund's test, in an oral dose of 100 mg./kg., it causes a 72% inhibition of the painful symptoms. In an intraperitoneal dose of 125 mg./kg., the maximum lowering of temperature caused by the same compound is 1.8°C.

The products of Examples 41 and 42 also show anti-convulsant and sedative properties in the mouse.

Anti-convulsant effect

| Compound | intraperitoneal dose in mg./kg. | PENETRAZOL | | | STRYCHNINE | | |
|---|---|---|---|---|---|---|---|
| | | % mortality | % tonic crisis | % partial crisis | % mortality | % tonic crisis | % partial crisis |
| Control | | 100 | 100 | 0 | 70 | 80 | 20 |
| Ex. 41 | 200 | 10 | 0 | 100 | 30 | 100 | — |
| Ex. 42 | 140 | 10 | 0 | 100 | 100 | 100 | 0 |
| Phenyl-acetylurea | 100 | 0 | 0 | 0 | 50 | 100 | — |

Sedative effect

| Compound | intraperitoneal dose in mg./kg. | % Diminution of spontaneous mortality | RETURN TO SLEEP | |
|---|---|---|---|---|
| | | | Slumber time, hexobarbital alone | Duration of return to sleep |
| Ex. 41 | 200 | 75 | 17' 15" | 74' 15" |
| Ex. 42 | 70 | 52 | 15' | 53' |

The products of Example 26 (2-ethyl-4-(morpholinocarboxylmethyl)-3-oxo-2,3-dihydro-1,4-benzoxazine), Example 34 (4-carboxamidomethyl-6-chloro-3-oxo-2,3-dihydro-1,4-benzoxazine), Example 35 (4-(N-dimethylcarboxamidomethyl)-6-chloro-3-oxo-2,3-dihydro-1,4-benzoxazine), and Example 39 (4-(piperidinocarboxylmethyl)-6-chloro-3-oxo-2,3-dihydro-1,4-benzoxazine), have anti-inflammatory properties towards carragenin oedema, combined with more of less pronounced analgesic, antipyretic and central depressant properties.

The anti-inflammatory effects are set out in the following Table.

| Compound | LD 50 (oral in mg./kg.) | oral dose | inhibition of oedema |
|---|---|---|---|
| Ex. 26 | 1200 | 100 | 40.1 |
| Ex. 34 | 1500 | 100 | 22.6 |
| Ex. 35 | 1500 | 100 | 22.6 |
| Ex. 39 | 1400 | 100 | 20.8 |

4-bis(N-pentamethylenecarboxamido)methyl-3-oxo-2,3-dihydro-1,4-benzoxazine (the product of Example 87) and 2-ethyl-4-bis(N-pentamethylenecarboxamido)-3-oxo-2,3-dihydro-1,4-benzoxazine (the product of Example 86) show anti-inflammatory properties against oedema caused by carragenin. They also have antipyretic properties.

| Compound | LD 50 | Anti-inflammatory activity | | Anti-pyretic activity | |
|---|---|---|---|---|---|
| | | Oral dose | % Inhibition of oedema | Intraperitoneal dose | Max. Temp. lowering observed |
| 87 | >1500 | 200 | 23.9 | 200 | 1.1°C. |
| 86 | >1500 | 200 | 37.7 | 200 | 2.2°C. |
| | | 100 | 25.4 | | |

The product of Example 2 (4-(N-dimethylcarboxamidomethyl)-3-oxo-2,3-dihydro-1,4-benzoxazine) has valuable anti-convulsant properties against the effects of pentetrazol. It is less effective against strychnine. It also exerts protective effects against electric shock in rats. For this reason it is therapeutically useful as an anti-epileptic. The test results are shown in the following Tables.

Anti-convulsant effect towards Penetrazol and Strychnine

| Compound | LD 50 | | Dose in mg./kg. | PENTETRAZOL | | | STRYCHNINE | | |
|---|---|---|---|---|---|---|---|---|---|
| | intraperitoneal in mg./kg. | oral in mg./kg. | | % mortality | % tonic crisis | % partial crisis | % mortality | % tonic crisis | % partial crisis |
| Control | — | | | 100 | 100 | | 100 | 100 | |
| Compound of Example 2 | 700 | 1600 | 140 | 0 | 0 | 100 | 40 | 100 | |

4-Carboxamido-6-chloro-8-methyl-3-oxo-2,3-dihydro-1,4-benzoxazine (the product of Example 72), 4-N-dimethylcarboxamidomethyl-6-chloro-8-methyl-3-oxo-2,3-dihydro-1,4-benzoxazine (the product of Example 73), 2-ethyl-4-carboxamidomethyl-6-chloro-8-methyl-3-oxo-2,3-dihydro-1,4-benzoxazine (the product of Example 69), and 2-ethyl-4-N-dimethylcarboxamidomethyl-6-chloro-8-methyl-3-oxo-2,3-dihydro-1,4-benzoxazine (the product of Example 70) show marked anti-pentetrazol properties, and the compounds of Example 69 and 70 antagonise the toxic effects of strychnine.

The products of Example 18 (2-methyl-4-(N-dimethylcarboxamidomethyl)-3-oxo-2,3-dihydro-1,4-benzoxazine), Example 19 (2-methyl-4-(piperidinocarboxylmethyl)-3-oxo-2,3-dihydro-1,4-benzoxazine), Example 21 (2-ethyl-4-(N-dimethylcarboxamidomethyl)-3-oxo-2,3-dihydro-1,4-benzoxazine), and Example 22 (2-ethyl-4-(N-diethylcarboxamidomethyl)-3-oxo-2,3-dihydro-1,4-benzoxazine) have a depressant effect on the turning reflex in mice. This is shown in the following Table.

| Compound | Method of Administration | Toxicity LD 50 in mg./kg. | Paralysing Dose 50 |
|---|---|---|---|
| Ex. 18 | oral | 800 | 120 |
| | intraperitoneal | 600 | 38 |
| Ex. 19 | oral | 700 | 87.5 |
| | intraperitoneal | 225 | 22.5 |
| Ex. 21 | " | 800 | 70 |
| | | 450 | 28 |
| Ex. 22 | " | 1400 | 160 |
| | | 375 | 57 |

| Compound | LD 50 | | Dose mg./kg. | PENTETRAZOL | | | STRYCHNINE | | |
|---|---|---|---|---|---|---|---|---|---|
| | Intraperitoneal | Oral | | % mortality | % tonic crises | % partial crises | % mortality | % tonic crises | % partial crises |
| Ex. 72 | >1000 | >1500 | 200 | 0 | 0 | 100 | 90 | 100 | |
| Ex. 73 | >1000 | >1500 | 200 | 0 | 0 | 100 | 90 | 100 | |
| Ex. 69 | — | >1500 | 100 | 20 | 10 | 90 | 50 | 90 | 10 |
| Ex. 70 | >1000 | >1500 | 200 | 20 | 10 | 90 | 60 | 100 | |

Anti-convulsant effect against Electric Shock

| | Dose mg./kg. | Delay | % tonic crises | % flattened crises | % shock without crises |
|---|---|---|---|---|---|
| Control | — | | 100 | — | — |
| Compound of Ex. 2 | 70 | 1 hour | 0 | 60 | 40 |
| | | 2 hours | 40 | 60 | — |

Three other compounds, viz. 2-isopropyl-4-N-dimethylcarboxamidomethyl-3-oxo-2,3-dihydro-1,4-benzoxazine (the product of Example 56), 2-isopropyl-4-N-pentamethylene carboxamidomethyl-3-oxo-2,3-dihydro-1,4-benzoxazine (the product of Example 57), and 2-butyl-4-N-dimethylcarboxamidomethyl-3-oxo-2,3-dihydro-1,4-benzoxazine (the product of Example 59), have a depressant effect on the turning reflex in mice in doses very much less than the toxic dose.

| Compound | Route of administration | LD 50 | Paralysing dose 50 (mg/kg) |
|---|---|---|---|
| Ex. 56 | oral | 550 | 35 |
|  | I.P. | 225 | 18 |
| Ex. 57 | oral | 600 | 100 |
|  | I.P. | 225 | 26 |
| Ex. 59 | I.P. | 160 | 18 |

The anti-convulsant effect towards strychnine in mice of the product of Example 21 makes it a good muscular relaxing substance. The percentage protection against mortality and number of crises are shown in the following Table.

| Oral Dose in mg./kg. | STRYCHNINE | | PENTETRAZOL | |
|---|---|---|---|---|
|  | mortality | crises | mortality | crises |
| 50 | 0 | 70 | 100 | 100 |

The muscular-relaxing properties of the product of Example 21 were also established by the following tests:

a. Study on decerebtrated rats (see Streichenberger et al., Therapie, 20, 149, (1965).

This technique uses the inhibiting effect of the compound under test, when administered intravenously, on the ipsilateral flexing reflex caused electrically in decerebrated rats. Under these conditions the product of Example 21 produces a considerable reduction in the contraction of the anterior tibial muscle. This effect, which is already detectable at a dose of 1 mg./kg, increases in duration and intensity as the doses increase, as shown in the following Table:

| Dose/kg. | Inhibition (in 5 minutes) |
|---|---|
| 1 mg | 25% |
| 2 mg | 33% |
| 4 mg | 56% |
| 5 mg | 75% | b. Study of the paralysing effect on rabbits.

The compound is administered by slow perfusion. The minimum paralysing dose (m P D) is established by the dropping of the head of the animal. The minimum fatal dose (m F D) is determined while the amount of product perfused is progressively increasaed. The m P D is about 10 mg/kg for a m F D of 200 mg/kg. The ratio $m\,F\,D/m\,F\,D = 20$ is very advantageous.

The product of Example 21 furthermore has appreciable anti-inflammatory properties. When orally administered to rats at a dose of 50 mg/kg it causes a 30.4% reudction in the carragenin oedema. Under the same conditions and at a dose of 100 mg/kg butazolidine reduces the oedema 45%.

Anti-reserpine Effect.

The products of Example 3 (4-carboxamidomethyl-3-oxo-2,3-dihydro-1,4-benzoxazine), Example 17 (2-methyl-4-carboxamidomethyl-3-oxo-2,3-dihydro-1,4-benzoxazine), Example 20 (2-ethyl-4-carboxamidomethyl-3-oxo-2,3-dihydro-1,4-benzoxazine), Example 44 (4-(N-dimethylcarboxamidomethyl)-7-chloro-3-oxo-2,3-dihydro-1,4-benzoxazine), and Example 45 (2-ethyl-4-carboxamidomethyl-7-chloro-3-oxo-2,3-dihydro-1,4-benzoxazine) oppose the depressant effects of reserpine in mice, and can thus be used as anti-depressants.

This is illustrated by the results in the following Table showing the percentage reduction of the ptosis induced by reserpine.

| Compound | Toxicity LD 50 | | Intraperitoneal Dose | % diminution |
|---|---|---|---|---|
|  | intraperitoneally in mg/kg. | orally in mg/kg. |  |  |
| 3 | 1000 | 1500 | 200 | 56 |
|  |  |  | 25 | 45 |
| 17 | 900 | 1500 | 180 | 84 |
|  |  |  | 50 | 81 |
|  |  |  | 25 | 18 |
| 20 | 975 | 1500 | 195 | 62 |
|  |  |  | 25 | 0 |
| 44 | 525 | 1500 | 100 | 26 |
|  |  |  | 25 | 23 |
| 45 | 650 | 1500 | 55 | 36 |
|  |  |  | 25 | 25 |

In addition, 4-carboxamidomethyl-8-chloro-3-oxo-2,3-dihydro-1,4-benzoxazine (the product of Example 77) antagonises the depressant effect (ptosis) caused by reserpine in mice. This compound has an intraperitoneal LD 50 greater than 1000 mg/kg. When administered intraperitoneally it causes in a dose of 25 mg/kg a 34% diminution of the ptosis, in a dose of 50 mg/kg a 71% reduction, and in a dose of 100 mg/kg a 76% reduction of the ptosis.

The invention accordingly includes within its scope pharmaceutical compositions comprising one or more of the compounds of formula I in association with a compatible, pharmaceutically acceptable carrier or coating. Such compositions will ordinarily be in a form suitable for oral administration, e.g. tablets, pills, powders, syrups, or elixirs, or parenteral administration, e.g. sterile injectible solutions or suspensions. The carriers or coating and methods of formulation may be those customarily used in the art provided that they do not impare the valuable therapeutic properties of the active compound.

I claim:

1. A pharmaceutical composition comprising, in association with a compatible non-toxic pharmaceutical carrier or diluent, an amount therapeutically effective on the central nervous system of 1,3-oxo-2,3-dihydro-1,4-benzoxazine of the formula:

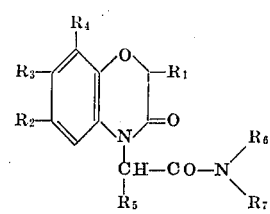

in which $R_1$ represents straight or branched lower alkyl, $R_2$, $R_3$ and $R_4$ are identical or different and each represents a hydrogen atom, straight or branched lower alkyl, a halogen atom, or lower alkoxy, $R_5$ represents a hydrogen atom, lower alkyl, and $R_6$ and $R_7$ are identical or different, and each represents a hydrogen atom, phenyl or lower alkyl-substituted phenyl, lower alkyl, or lower hydroxyalkyl or $R_6$ and $R_7$ taken together with the nitrogen atom to which they are attached, form a heterocyclic 5 or 6 ring member.

2. The composition of claim 1 wherein $R_3$ is methyl.

3. The composition of claim 1 in which the compound is 4-dimethylcarboxyamidomethyl-6-butyl-3-oxo-2,3-dihydro-1,4-benzoxazine.

4. The composition of claim 1 in which the compound is 2-ethyl-4-(α-carboxyamidomethyl)-6-methyl-2,3-dihydro-1,4-benzoxazine.

5. The composition of claim 1 in which the compound is 4-N-dimethylcarboxyamidomethyl-8-chloro-3-oxo-2,3-dihydro-1,4-benzoxazine.

6. The composition of claim 1 in which the compound is 4-N-pentamethylenecarboxyamidomethyl-8-chloro-3-oxo-2,3-dihydro-1,4-benzoxazine.

7. The composition of claim 1 in which the compound is 2-ethyl-4-carboxyamidomethyl-6-chloro-3-oxo-2,3-dihydro-1,4-benzoxazine.

8. The composition of claim 1 in which the compound is 2-ethyl-4-(N-dimethylcarboxyamidomethyl)-6-chloro-3-oxo-2,3-dihydro-1,4-benzoxazine.

9. The composition of claim 1 in which the compound is 2-ethyl-4-carboxyamidomethyl-3-oxo-2,3-dihydro-1,4-benzoxazine.

10. The composition of claim 1 in which the compound is 2-butyl-4-N-pentamethylenecarboxyamidomethyl-6-methyl-3-oxo-2,3-dihydro-1,4-benzoxazine.

11. The composition of claim 1 in which the compound is 2-ethyl-4-(morpholinocarboxylmethyl)-3-oxo-2,3-dihydro-1,4-benzoxazine.

12. The composition of claim 1 in which the compound is 4-carboxyamidomethyl-6-chloro-3-oxo-2,3-dihydro-1,4-benzoxazine.

13. The composition of claim 1 in which the compound is 4-(N-dimethylcarboxyamidomethyl)-6-chloro-3-oxo-2,3-dihydro-1,4-benzoxazine.

14. The composition of claim 1 in which the compound is 4-(piperidinocarboxylmethyl)-6-chloro-3-oxo-2,3-dihydro-1,4-benzoxazine.

15. The composition of claim 1 in which the compound is 4-(N-dimethylcarboxyamidomethyl)-3-oxo-2,3-dihydro-1,4-benzoxazine.

16. The composition of claim 1 in which the compound is 4-carboxyamido-6-chloro-8-methyl-3-oxo-2,3-dihydro-1,4-benzoxazine.

17. The composition of claim 1 in which the compound is 4-N-dimethylcarboxyamidomethyl-6-chloro-8-methyl-3-oxo-2,3-dihydro-1,4-benzoxazine.

18. The composition of claim 1 in which the compound is 2-ethyl-4-carboxyamidomethyl-6-chloro-8-methyl-3-oxo-2,3-dihydro-1,4-benzoxazine.

19. The composition of claim 1 in which the compound is 2-ethyl-4-N-dimethylcarboxyamidomethyl-6-chloro-8-methyl-3-oxo-2,3-dihydro-1,4-benzoxazine.

20. The composition of claim 1 in which the compound is 2-methyl-4-(N-dimethylcarboxyamidomethyl)-3-oxo-2,3-dihydro-1,4-benzoxazine.

21. The composition of claim 1 in which the compound is 2-methyl-4-(piperidinocarboxylmethyl)-3-oxo-2,3-dihydro-1,4-benzoxazine.

22. The composition of claim 1 in which the compound is 2-ethyl-4-(N-dimethylcarboxyamidomethyl)-3-oxo-2,3-dihydro-1,4-benzoxazine.

23. The composition of claim 1 in which the compound is 2-ethyl-4-(N-diethylcarboxyamidomethyl)-3-oxo-2,3-dihydro-1,4-benzoxazine.

24. The composition of claim 1 in which the compound is 2-isopropyl-4-N-dimethylcarboxyamidomethyl-3-oxo-2,3-dihydro-1,4-benzoxazine.

25. The composition of claim 1 in which the compound is 2-isopropyl-4-N-pentamethylenecarboxyamidomethyl-3-oxo-2,3-dihydro-1,4-benzoxazine.

26. The composition of claim 1 in which the compound is 2-butyl-4-N-dimethylcarboxyamidomethyl-3-oxo-2,3-dihydro-1,4-benzoxazine.

27. The composition of claim 1 in which the compound is 4-caroboxyamidomethyl-3-oxo-2,3-dihydro-1,4-benzoxazine.

28. The composition of claim 1 in which the compound is 2-methyl-4-carboxyamidomethyl-3-oxo-2,3-dihydro-1,4-benzoxazine.

29. The composition of claim 1 in which the compound is 4-(N-dimethylcarboxyamidomethyl)-7-chloro-3-oxo-2,3-dihydro-1,4-benzoxazine.

30. The composition of claim 1 in which the compound is 2-ethyl-4-carboxyamidomethyl-7-chloro-3-oxo-2,3-dihydro-1,4-benzoxazine.

31. The composition of claim 1 in which the compound is 4-carboxyamidomethyl-8-chloro-3-oxo-2,3-dihydro-1,4-benzoxazine.

* * * * *